Sept. 10, 1929.  P. B. DAVID ET AL  1,727,813
WIRELESS AMPLIFYING RECEIVER UNAFFECTED BY STRAYS
Filed June 4, 1925  2 Sheets-Sheet 1

Patented Sept. 10, 1929.

1,727,813

UNITED STATES PATENT OFFICE.

PIERRE BERNARD DAVID AND RENÉ MARIE MESNY, OF PARIS, FRANCE.

WIRELESS AMPLIFYING RECEIVER UNAFFECTED BY STRAYS.

Application filed June 4, 1925, Serial No. 34,846, and in France June 7, 1924.

The object of the invention described hereinbelow is a new type of wireless amplifying receiver which thoroughly protects, by its mere use and without any complicated adjustment the wireless transmission against the most powerful strays.

In order to understand the principle underlying the invention, it should be borne in mind that the statics and the damped strays are very difficult to eliminate in the usual receivers; the reason is that they cause oscillations to arise in the circuits which vibrate therefore according to their own period as if they were receiving waves to the length of which they are tuned. The result is a disturbance which cannot be separated by any selective device from the real wireless signals.

Our invention provides for a radio communication unaffected by strays. The receiver described hereinafter is adapted to work with emitting stations producing undamped waves modulated by the said emitting station when it is desired to transmit any signals.

The receiver is such that it is unaffected by the strays and by the undamped waves when they are not modulated. It is affected only when the modulations of the waves provide a diminution of the amplitude of the waves. Thus the receiver gives out only the signals and never the strays which at the worst may prevent part of a signal from being detected.

Figure 3:
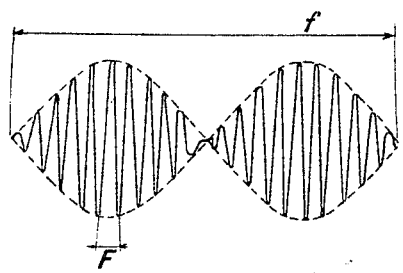
Figure 4:
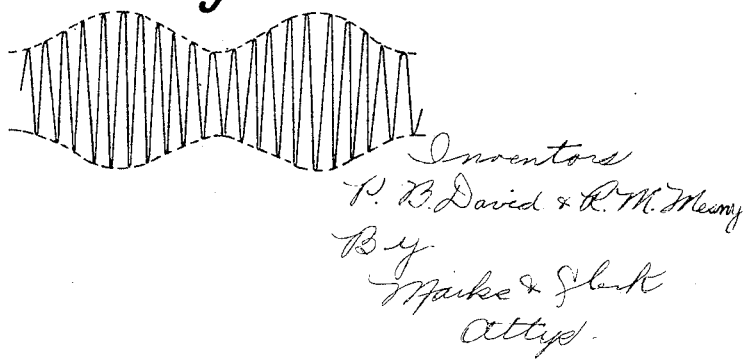

Figs. 3 and 4 are diagrams showing the oscillations in the receiving circuits.

The receiver comprises a detecting device which is constantly oscillating under the influence of the undamped waves received and which produces an alternating current the intensity of which increases with the intensity of the waves received. This current is then sent into a quenching device which quenches the said current when its amplitude is greater than a given amount. This is the case when it is produced by the undamped waves received by the emitting station and by strays. Current is allowed to flow out of the quenching device only when the current sent into it is caused to fall below the said given amount that is when a signal is transmitted or otherwise stated the amplitude of the waves is caused to decrease through the modulation imposed on the emitted waves.

Figure 1:
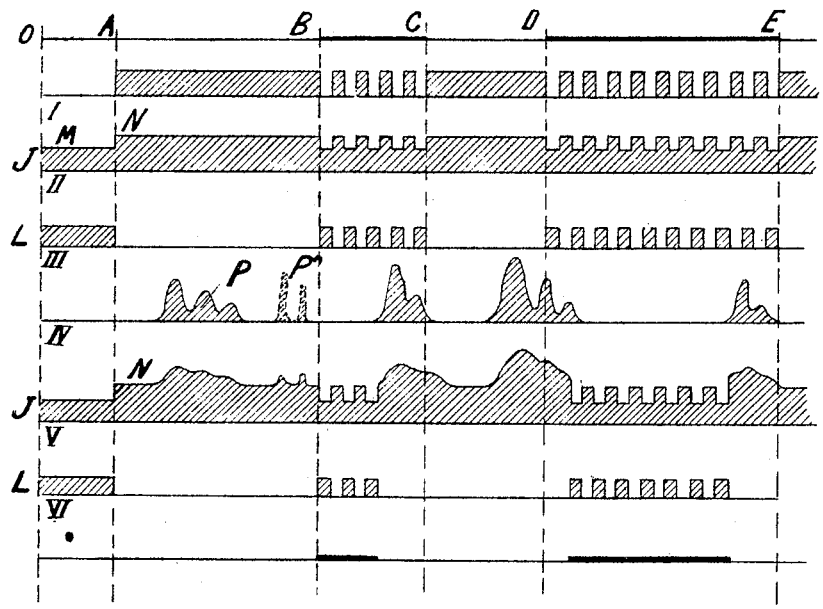
Fig. 1 shows a series of diagrams explaining the principle underlying the invention.

On Fig. 1 the two curves I and II are two diagrams showing with reference to times as abscissas, the former the amplitude of the undamped waves of the emitting station, the latter the intensity J of the current fed by the detecting device. Suppose an undamped emission begins at A (curve I); at the same time the intensity J will pass from M to N (curve II). If the emission is modulated, that is, interrupted at regular intervals during the brief interval BC corresponding to a dot of the Morse alphabet or during the longer interval DE corresponding to a dash, the intensity J of the current fed by the oscillating device will vary between the values N and M each time the emission is interrupted.

This current J is sent into a suitable quenching device which gives out a current L (D. C. for instance) as long as the intensity J is smaller than N. When J reaches this value or passes beyond it, the quenching device stops the flow of the current L.

If therefore the values of this current L are figured on curve III of Fig. 1, it can be noted that they are different from zero during the intervals such as OA during which there is no emission and the intensity of the current fed by the detecting device is M; on the contrary, the current L is suppressed as soon as under the influence of the emission, the current J reaches the value N; this happens during the intervals AB, CD. Lastly when the emission is modulated as in the intervals BC, DE the current L is modulated in a similar manner.

It has been supposed in the above described working that there are no strays. Hereinbelow the effect of powerful strays such as those shown by curve IV of Fig. 1 is shown by curve V giving the corresponding values of the current J produced by the detecting device. The strays produce oscillations in the detecting circuit whereby the intensity J is increased. During the periods such as OA when no signals are being emitted and J is normally at its lower value M the strays can bring it to the higher value N whereby the quenching device prevents the current J from producing a current L; on the contrary during the intervals such as AB when the current J has normally the intensity N, the increase of this intensity beyond this value N by the strays has no effect and the current L (curve VI) remains at zero as before.

This receiver is thus unaffected by the strays sent by the emitting station, provided the latter emits undamped waves.

It should be noted that on curve IV the duration of the strays P has been purposely exaggerated for sake of clearness; in reality the strays consist generally in a succession of very short disturbances such as are shown by the dotted curve P'. In quick succession these disturbances appear in an ordinary receiver as a continuous rolling; but they are, really, separated by silences, during which the normal working of the devices can be resumed.

Let us suppose the emitted waves are modulated so as to form the signals to be transmitted. The curve 1 shows how the letter A for instance (dot B. C. dash D. E.) is transmitted.

As explained hereinabove, the current L fed by the quenching device (curve III) is zero during the intervals separating the signals, however great the strays may be; on the contrary during the emission of the signals, the current is periodically increased at a frequency equal to that of the interruptions of the transmitted waves. The strays can cause these increases to be irregular or can even suppress them partly as at point D, because powerful strays prevent the intensity J from falling to its lower value M; but these are only partial suppressions, unless they are caused by absolutely uninterrupted strays, which hardly ever happen in practice. In the case illustrated by the curves IV, V and VI it can be noticed that, during the transmission of the dot and dash (BC and DE), part of the periodical increases of current L continues to exist and what remains will be sufficient to actuate during the intervals BC, DE either a relay or a telephone. With the latter, the tone and the intensity of the sound perceived can be altered by the strays; but the signal will nevertheless appear as an audible tone.

Any modulating device can be used for emitting the signals, such as a transformer fed with alternating current and feeding the circuit at a suitable point, or an auxiliary oscillating vacuum tube. This modulating device is controlled by the circuit breaker and is set working when the latter is at its working position. It is short circuited when the circuit breaker is at its position of rest.

Figure 2:
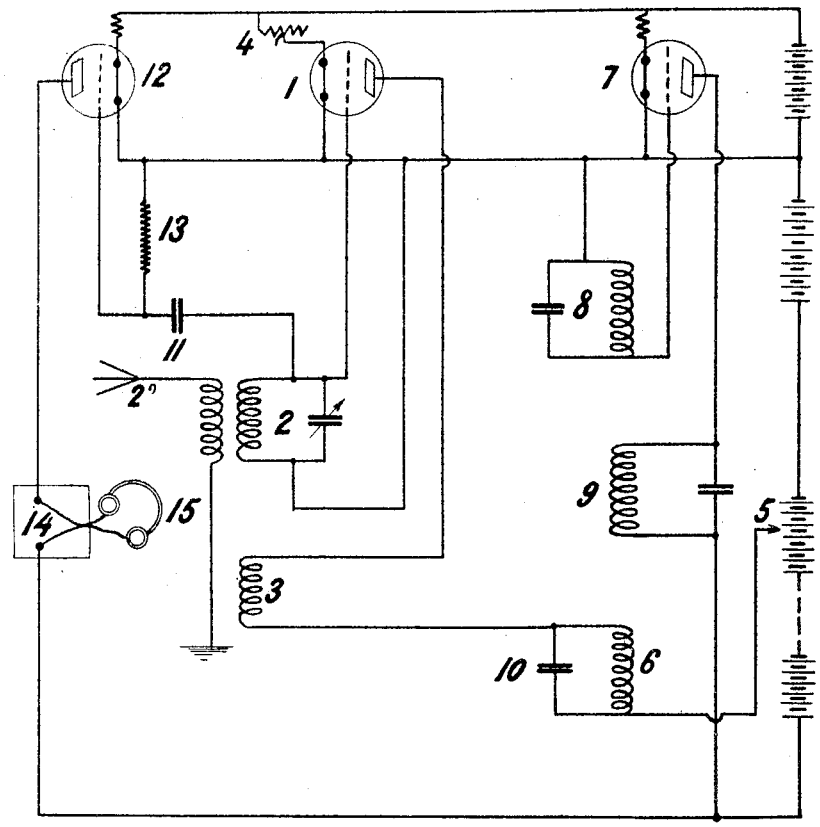
Fig. 2 is a diagram of the connections embodying the said invention.

Fig. 2 is a diagram showing by way of example one of the numerous forms of execution of the invention.

The detecting device of the receiver comprises a first oscillating device the frequency of which is F and constituted by a vacuum tube 1 (or a plurality of vacuum tubes) an oscillating circuit 2 receiving from the antenna 2' (or from a frame) the incoming signal currents which are to be amplified and a reaction coil 3 inserted in the plate circuit.

A second oscillating device comprises the vacuum tube 7 and the tuned circuits 8 and 9 and acts through the coil 6 on the plate of the vacuum tube 1. The potential of the plate of tube 1 instead of being constant is then the sum of the potential of the battery as fed through 5 and of the alternating potentials induced in the coil 3 and 6. It is necessary that the frequency $f$ of the oscillations in the device 7, 8, 9 should be much smaller than F, for instance several thousand per second if F is a high frequency of about one million periods per second which corresponds to the short waves for which the device is especially used.

The coil 6 is shunted by the condenser 10 which lets the high frequency oscillations pass.

With a proper adjustment the vacuum tube 1 is thus submitted to alternately high and low plate tensions. In the plate and grid circuits of the vacuum tube 1 the oscillations of frequency F are modulated at the frequency $f$ as shown on Fig. 3.

The mean value of the current passing through the plate circuit of the tube 1 is comparatively great and corresponds to the value M of the current J on Fig. 1. Experience shows that when the circuit 2 is under the influence of an external oscillating potential of constant value, the said current is modified in the following manner. The maximum is not changed or slightly increased and the minimum alone is increased by an important quantity so that the current can be represented by the curve shown on Fig. 4. Its mean value is greater than it would be if it were not to receive any external impulse. Thus the undamped waves received from the emitting station will increase the mean value of the current from M to N as shown hereinbefore with reference to Fig. 1. Strays would cause a still greater increase of the mean current. When the transmitting station sends signals (dots or dashes) by interrupting the undamped wave it emits, each time the wave is interrupted or greatly diminished, the current of the vacuum tube 1 comes back to its original value M or very near it, whereby the phenomena described hereinabove with reference to curve II of Fig. 1 are caused to take place.

The grid of the vacuum tube 1 is connected with the grid of the vacuum tube 12 acting as a quenching device through a suitable condenser and a resistance 13 sets the mean value of the grid 12 at its proper value; of course instead of coupling the two grids the plate of 1 might as well be coupled with the grid of 12. The receiver 15 which is a telephone or a relay, for instance, is inserted in the plate circuit of the audion 12. It can be protected by a filter 14 against the hissing produced by the variations of the plate potential.

The oscillations of the grid potential of the vacuum tube 1, transmitted to the grid of the vacuum tube 12 have the well known property of diminishing the mean potential of this last grid and thereby diminish the plate current feeding the telephone. This current falls thus to zero for a certain amplitude of the oscillations of the vacuum tube 1. When these oscillations increase beyond this amplitude, the tube 12 cannot obviously be affected and the intensity of the plate current feeding the telephone remains equal to zero.

The vacuum tube 12 connected as described acts thus as a quenching device as explained in the first part of the specification.

The adjustment is provided as follows: the circuit 2 is first tuned to the frequency of the incoming waves after which the looseness of the coupling between 2 and 3, the degree of heating of the filament of the tube 1 or the mean potential of the plate of tube 1 are adjusted so as to make the oscillations in the said tube reach, under the action of the non-modulated incoming waves, the amplitude which is just necessary for bringing the plate current of the tube 12 to zero.

Under these conditions the statics or strays which produce a passing increase of more or less great intensity in the amplitude of the oscillations have absolutely no effect on the telephone or the relay because the plate circuit of the tube 12 is not affected by them and the current passing through it is substantially zero whilst the said strays or statics are acting.

In the intervals between the signals, however great the strays may be, the telephone does not give any sound except the hissing from the vacuum tube 7, which hissing either is not disturbing or else can be eliminated by the filter 14.

Each time the incoming waves are interrupted, the amplitude of the oscillations of the vacuum tube 1 diminishes as explained hereinabove; current is allowed to pass through the plate circuit of the tube 12 and to actuate the receiver. If the incoming waves are modulated and the receiver is a telephone, the current passing out of the plate of the tube 12 will be correspondingly modulated and cause the telephone to emit musical sounds corresponding to the modulations of the incoming waves.

What we claim is:

1. A radio receiver comprising a local generator of undamped waves having a frequency of the incoming modulated undamped continuously emitted waves, means for modulating at the receiving station the waves produced by the local generator, means for superimposing the local waves thus modulated on the incoming waves, means for quenching the current produced by this superimposition when it rises above a value slightly superior to the mean value of the local undamped waves and a receiving device adapted to receive the said current when the modulations of the incoming waves cause it, in the absence of strays, to remain below the said first mentioned value, and to be detected by the quenching device.

2. A radio receiver comprising a vacuum tube generating local undamped waves having the frequency of the incoming modulated undamped continuously emitted waves, a second vacuum tube generating waves at a much lower frequency, means whereby these latter waves are made to modulate those generated by the first vacuum tube, means for superimposing the local waves thus modulated on the incoming waves, means for quenching the current produced by this superimposition when it rises above a value slightly superior to the mean value of the local undamped waves and a receiving device adapted to receive the said current when the modulations of the incoming waves cause it, in the absence of strays, to remain below the said first mentioned value, and to be detected by the quenching device.

3. A radio receiver comprising a local generator of undamped waves having the frequency of the incoming modulated undamped continuously emitted waves, means for modulating at the receiving station the waves produced by the local generator, means for superimposing the local waves thus modulated on the incoming waves, a detecting vacuum tube adapted to quench the current produced by this superimposition when it rises above a value slightly superior to the mean value of the local undamped waves and a receiving device adapted to receive the said current when the modulations of the incoming waves cause it, in the absence of strays, to remain below the said first mentioned value, and to be detected by the quenching device.

4. A radio receiver comprising a vacuum tube generating local undamped waves having the frequency of the incoming modulated undamped continuously emitted waves, a second vacuum tube generating waves at a much lower frequency, means whereby these latter waves are made to modulate those generated by the first vacuum tube, means for superimposing the local waves thus modulated on the incoming waves in the first vacuum tube, a detecting vacuum tube adapted to quench the current produced by this superimposition when it rises above a value slightly superior to the mean value of the local undamped waves and a receiving device adapted to receive the said current when the modulations of the incoming waves cause it, in the absence of strays, to remain below the said first mentioned value and to be detected by the quenching device.

5. A radio receiver comprising a local generator of undamped waves having the frequency of the incoming modulated undamped continuously emitted waves, means for modulating at the receiving station the waves produced by the local generator, means for superimposing the local waves thus modulated on the incoming waves, means for quenching the current produced by this superimposition when it rises above a value slightly superior to the mean value of the local undamped waves and selecting and receiving devices tuned to the frequencies of the superposed modulations borne by the incoming waves and detected by the quenching device when the strays do not cause the current fed into said quenching device to rise above the stated limit.

6. A radio receiver comprising a vacuum tube generating local undamped waves having the frequency of the incoming modulated undamped continuously emitted waves, a second vacuum tube generating waves at a much lower frequency, means whereby these latter waves are made to modulate those generated by the first vacuum tube, means for superimposing the local waves thus modulated on the incoming waves, in the first vacuum tube, means for causing the inaudible frequency of the modulations of the incoming waves to produce beats with the oscillations of the circuit of the second vacuum tube, means for quenching the current produced by this superimposition when it rises above a value slightly superior to the mean value of the local undamped waves and a receiving device adapted to receive the said current when the modulations of the incoming waves cause it, in the absence of strays, to remain below the said first mentioned value, and to be detected by the quenching device.

In witness whereof we have hereunto set our hands.

RENÉ MARIE MESNY.
PIERRE BERNARD DAVID.